US011671307B1

(12) United States Patent
Karp et al.

(10) Patent No.: US 11,671,307 B1
(45) Date of Patent: Jun. 6, 2023

(54) ISSUES MANAGEMENT KEY RISK INDICATORS

(71) Applicant: Wells Fargo Bank, N.A., San Francisco, CA (US)

(72) Inventors: Brian Karp, Charlotte, NC (US); Damon Antoine Porter, Charlotte, NC (US); Sarah Krenz, Matthews, NC (US); Jody Vandever, Earlham, IA (US); Ryan Calef, Blue Bell, PA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/560,543

(22) Filed: Dec. 23, 2021

(51) Int. Cl.
*H04L 41/0604* (2022.01)
*H04L 41/0631* (2022.01)
*H04L 41/22* (2022.01)
*H04L 43/0817* (2022.01)
*H04L 43/06* (2022.01)

(52) U.S. Cl.
CPC ...... *H04L 41/0609* (2013.01); *H04L 41/0631* (2013.01); *H04L 41/22* (2013.01); *H04L 43/06* (2013.01); *H04L 43/0817* (2013.01)

(58) Field of Classification Search
CPC . H04L 41/0609; H04L 41/0631; H04L 41/22; H04L 43/06; H04L 43/0817
USPC ........................................................ 709/223
See application file for complete search history.

(56) References Cited

U.S. PATENT DOCUMENTS

| 8,489,499 | B2 | 7/2013 | Yan et al. | |
|---|---|---|---|---|
| 9,460,390 | B1* | 10/2016 | Lin | G06N 5/04 |
| 10,133,980 | B2 | 11/2018 | Turner et al. | |
| 2004/0054565 | A1* | 3/2004 | Nemecek | G06Q 10/06312 |
| | | | | 705/7.17 |
| 2007/0192474 | A1* | 8/2007 | Decasper | H04L 67/306 |
| | | | | 709/223 |
| 2014/0067734 | A1* | 3/2014 | Hawkins | G06N 20/00 |
| | | | | 706/58 |
| 2018/0005246 | A1* | 1/2018 | Basam | H04L 41/0631 |
| 2018/0374030 | A1* | 12/2018 | Barday | G06Q 10/1091 |

(Continued)

OTHER PUBLICATIONS

"Risk Management Software" web page accessed Aug. 8, 2021 and available < https://www.auditboard.com/product/risk-management/> retrieved from Internet Archive Wayback Machine <http://web.archive.org/web/20210630232602/https://www.auditboard.com/product/risk-management/> on Dec. 23, 2021).

(Continued)

*Primary Examiner* — Meng Vang
(74) *Attorney, Agent, or Firm* — Womble Bond Dickinson (US) LLP

(57) ABSTRACT

Systems, apparatuses, methods, and computer program products are disclosed for managing open issues. An example method includes obtaining a dashboard access request for a portion of open issues managed by the issue management system, the issue management system storing variables associated with each open issue of the open issues; obtaining a dashboard data package based on scores for the portion of open issues, the scores indicating a severity level of the open issues of the portion of open issues and being based on the variables that are stored in the issue management system; and performing an action set using the dashboard data package to manage the portion of open issues.

18 Claims, 11 Drawing Sheets

(56) References Cited

U.S. PATENT DOCUMENTS

2019/0392454 A1\* 12/2019 Gorny .................... G06Q 30/01
2020/0258013 A1\* 8/2020 Monnett ................ G06Q 10/06
2021/0240774 A1\* 8/2021 Bikumala ............... G06F 9/453

OTHER PUBLICATIONS

"How to Develop Key Risk Indicators (KRIs) to Fortify Your Business" web page accessed Aug. 8, 2021 and available < https://www.auditboard.com/blog/how-to-develop-key-risk-indicators-kris-to-fortify-business/> retrieved from Internet Archive Wayback Machine <http://web.archive.org/web/20210423112747/https://www.auditboard.com/blog/how-to-develop-key-risk-indicators-kris-to-fortify-business/> on Dec. 23, 2021).

\* cited by examiner

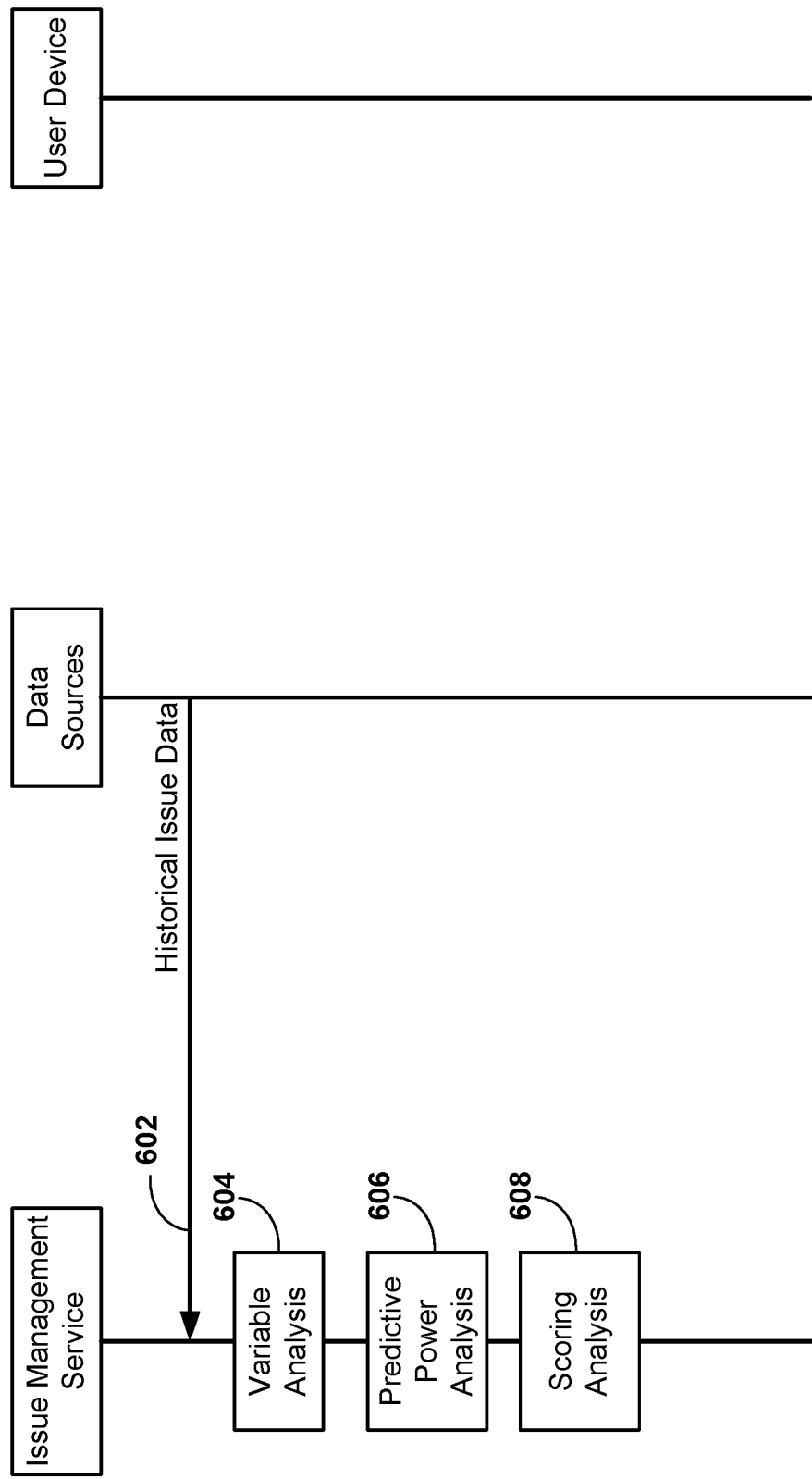

ISSUES MANAGEMENT KEY RISK INDICATORS

BACKGROUND

Organizations may be faced with issues of varying complexity and impact over time. To manage these issues, information regarding the issues may be collected by various systems. Issue management decisions may be made based on the collected information. However, not all of the collected information may be useful in allocating resources to address the issues.

BRIEF SUMMARY

Distributed systems are relied upon to store a variety of types of data and provide services in particular manners. Significant impacts may result should various types of data be inadvertently disclosed to unintended recipients. Consequently, various safeguards and processes may be put in place to reduce the likelihood of unintentional disclosure of data.

The processes may be put in place due to, for example, internal organizational processes which may deem it necessary to protect such data, external review processes performed by private auditors or public regulatory bodies, and/or through other means. If a process is deemed to be necessary (or modification to an existing process), an open issue arises until the process is put into place. In some cases, such as the regulatory context, open issues may need to be resolved (e.g., by putting in place corresponding processes) within predetermined periods of time to avoid corresponding consequences (e.g., fines, regulation, etc.)

However, resolving (e.g., remediating) an open issue may be a costly process, and it may be challenging to ascertain which open issues may be less likely to be appropriately resolved when compared to other open issues. Further, the quantity of information tracked regarding open issues may be such that manual analysis of the information may not be tractable.

Systems, apparatuses, methods, and computer program products are disclosed herein for managing open issues in a distributed system in a manner that is more likely to resolve the open issues in a timely manner. Open issues may be resolved timely by rationing allocations of resources to only those open issues and in quantities necessary to meet resolution timeliness goals (e.g., to avoid consequences for failing to meet timeliness goals).

To facilitate resource allocation, a dashboard may be used to effectively communicate, to users, severity levels of various open issues. Users may utilize the information included in the dashboard to make appropriate resource allocation decisions.

The dashboards, and content thereof, may be based on one or more scores of open issues reflecting the relative severity of the open issues. The scores may be obtained using a scoring system that may be based on historical relationships between various portions of monitored information regarding open issues and the outcomes of the open issues. For example, the historical relationships may be subjected to various forms of analysis to discriminate more predictive portions of monitored information from less predictive portions of monitored relationships, and the relative predictive power level of the portions of monitored information.

Consequently, a system in accordance with embodiments disclosed herein may relieve a user of the cognitive burden of reviewing and interpreting large amounts of monitored information to estimate a severity level of each open issue. Rather, using the dashboard, a user may be efficiently informed of the severity level of each open issue. Consequently, a user may be able to make better resource allocation decisions by virtue of the lower cognitive burden on the user. Accordingly, a system in accordance with embodiments disclosed herein may be more likely to resolve open issues in a timely fashion than systems that rely on user-estimated severity levels of open issues.

In an example embodiment, a method for managing risk in a system is provided. The method may include obtaining, by dashboard management circuitry of an issue management system, a dashboard access request for a portion of open issues managed by the issue management system, the issue management system storing a plurality of variables associated with each open issue of the open issues; obtaining, by the dashboard management circuitry, a dashboard data package based on scores for the portion of open issues, the scores indicating a severity level of the open issues of the portion of open issues and being based on the plurality of variables that are stored in the issue management system; and performing, by the dashboard management circuitry, an action set using the dashboard data package to manage the portion of open issues.

Obtaining the dashboard data package may include, for each open issue of the portion of open issues, generating, by the dashboard management circuitry, a severity score using a scoring system, the scoring system being based on historical issues and corresponding issue outcomes.

The scoring system may ascribe zero weight to a majority of the plurality of variables and specifies weighting metrics from a minority of the plurality of variables usable to obtain a score for each of the minority of the plurality of variables. The scoring system may also ascribe non-zero weight to a minority of the plurality of variables, and a non-zero weight ascribed to each variable of the minority of the plurality of variables may be based on an absolute issue outcome predictive power level of its respective variable of the minority of the plurality of variables. The absolute issue outcome predictive power level of the respective variable is based, at least in part, on one of a population stability index analysis, a weight of evidence analysis, and an information value analysis of the minority of the plurality of variables.

The scoring system may ascribe quantities of points to variables of the plurality of variables and the scores are based on a summing of the quantities of points for variables of the plurality of variables corresponding to each of the open issues.

The plurality of variables may include at least one variable indicating: a number of days an open issue of the open issues has been open; a quantity of times a period for closing the open issue has been extended; a classification of the open issue; a quantity of corrective actions performed to correct the open issue; a quantity of related corrective actions performed to correct any of the open issues other than the open issue; a rating of the open issue; a quantity of reporting while the open issue is open; a root cause of the open issue; a name of an entity that is enforcing the open issue; a type of notification provided by the entity for the open issue; and a classification of a source of the open issue.

The scoring system may ascribe varying quantities of points for different ranges of the number of days the open issue has been open. The scoring system may also ascribe a quantity of points for the quantity of times the period of closing the open issue has been extended exceeding a threshold.

The scoring system may also ascribe a quantity of points for the classification of the open issue being a predetermined classification, the predetermined classification indicating that regulatory action will be taken should the open issue not be closed within a prescribed period of time.

In another example embodiment, an apparatus for managing risk in a system is provided. The apparatus may include communication hardware to obtain a dashboard access request for a portion of open issues managed by the issue management system, the apparatus storing a plurality of variables associated with each open issue of the open issues; and dashboard management circuitry to: obtain a dashboard data package based on scores for the portion of open issues, the scores indicating a severity level of the open issues of the portion of open issues and being based on the plurality of variables that are stored in the issue management system, and perform an action set using the dashboard data package to manage the portion of open issues.

In a further embodiment, a method for managing risk in a system is provided, the method may include initiating, by dashboard management circuitry of a user device, a dashboard access request for a portion of open issues managed by an issue management system, each open issue being associated with a plurality of variables tracked by the issue management system; obtaining, by the dashboard management circuitry and from the issue management system responsive to the dashboard access request, a dashboard data package based on scores for the portion of open issues, the scores indicating a severity level of the open issues of the portion of open issues and being based on the respective plurality of variables; generating, by graphical user interface management circuitry of the user device, a graphical user interface based on the dashboard data package, the graphical user interface comprising at least one area of a group of areas consisting of a severity visualization area, a severity change visualization area, and a severity trend visualization area; presenting, by display hardware of the user device, the graphical user interface to a user; obtaining, by input hardware of the user device, input from the user based on the presented graphical user interface; and performing, by the dashboard management circuitry, an action set based on the input to manage the risk in the system.

The dashboard data package may include a severity score based on a scoring system, the scoring system being based on historical issues and corresponding issue outcomes.

The scoring system may ascribe zero weight to a majority of the plurality of variables and specifies weighting metrics from a minority of the plurality of variables usable to obtain a score for each of the minority of the plurality of variables. The scoring system may also ascribe non-zero weight to a minority of the plurality of variables, and wherein a non-zero weight ascribed to each variable of the minority of the plurality of variables is based on an absolute issue outcome predictive power level of its respective variable of the minority of the plurality of variables.

The issue outcome predictive power level of the respective variable may be based, at least in part, on one of a population stability index analysis, a weight of evidence analysis, and an information value analysis of the minority of the plurality of variables.

The scoring system may ascribe quantities of points to variables of the plurality of variables and the scores are based on a summing of the quantities of points for the variables of the plurality of variables corresponding to each of the open issues.

In a further embodiment, an apparatus for managing risk in a system is provided, the apparatus may include dashboard management circuitry to: initiate a dashboard access request for a portion of open issues managed by an issue management system, each open issue being associated with a plurality of variables tracked by the issue management system; obtain, from the issue management system responsive to the dashboard access request, a dashboard data package based on scores for the portion of open issues, the scores indicating a severity level of the open issues of the portion of open issues and being based on the respective plurality of variables; graphical user interface management circuitry to generate a graphical user interface based on the dashboard data package, the graphical user interface comprising at least one area of a group of areas consisting of a severity visualization area, a severity change visualization area, and a severity trend visualization area; display hardware to display the graphical user interface to a user; input hardware to obtain input from the user based on the presented graphical user interface; and the dashboard management circuitry further to perform an action set based on the input to manage the risk in the system.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIGS. 6A-6C illustrate example operations of a system, in accordance with some example embodiments described herein.

DETAILED DESCRIPTION

Figure 1:
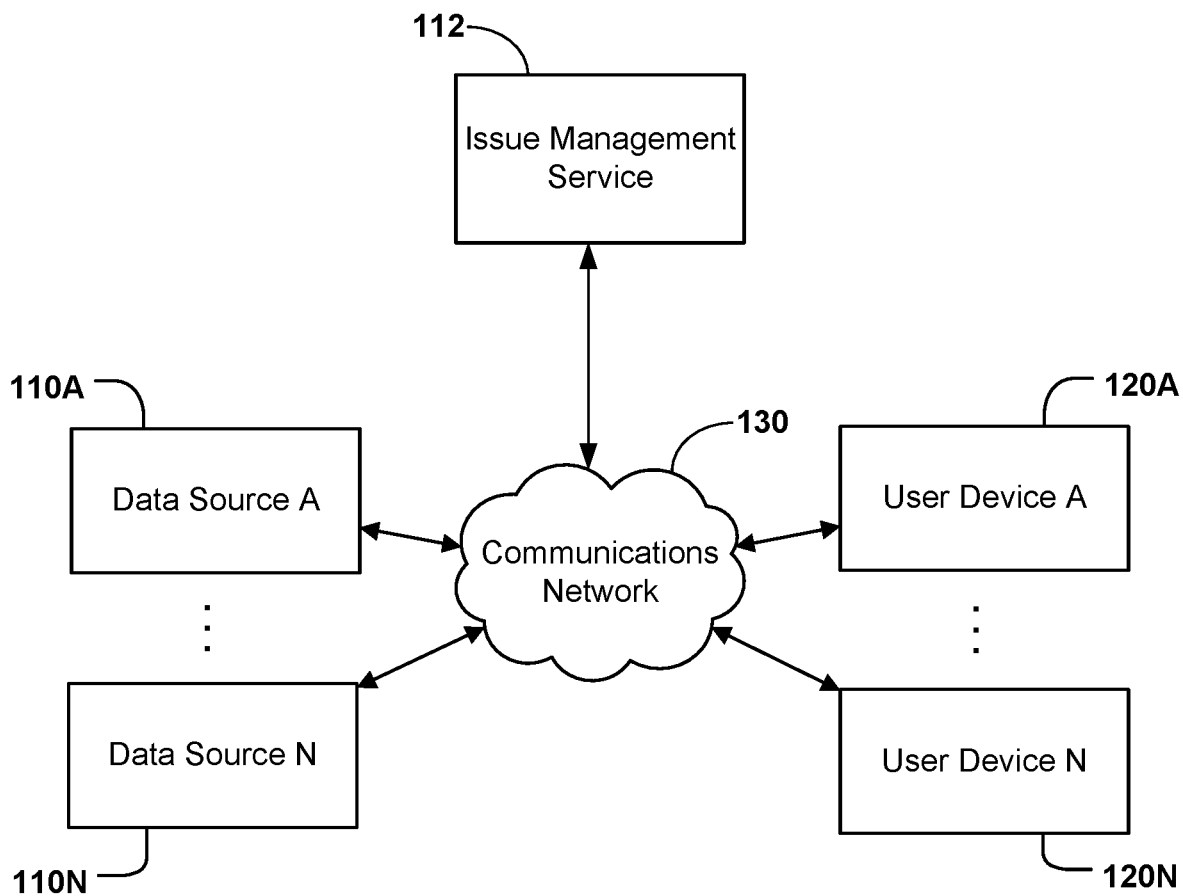
FIG. 1 illustrates a system in which some example embodiments may be used for authenticating devices and/or users thereof.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "predictive power" is used to refer to the ability (absolute or relative) for a portion of information to be used to predict a future outcome. The term "absolute issue outcome predictive power level" is used to refer to the ability for a portion of information to be used to predict a future outcome of an open issue on an absolute basis rather than a relative basis (e.g., scaled to a particular range or that otherwise does not include a relative basis to other power levels).

Overview

As noted above, example embodiments described herein provide methods, apparatuses, systems, and computer program products that provide for management of issues in distributed system. These embodiments may relate to many different types of issues such as, for example, technical issues, regulatory issues, governance issues, and/or other types of issues that are desired to be resolved. Some of these issues, such as regulatory issues, may present significant impacts on an organization should the issues not be resolved within prescribed periods of time.

To facilitate management of such issues, large quantities and types of information that may be relevant to resolution of the issues may be collected by the distributed system. For example, one or more variables, representing various pieces of information regarding an issues, may be monitored for the issues. Different types and quantities of variables may be monitored for the issues.

The monitoring of the variables may be performed, for example, to collect information that may be usable to manage deployment of resources for remediating the issues. However, due to resource limitations, it may be desirable to ration the resources deployed for the management of the respective issues. For example, an organization may only employ a limited number of persons that may be tasked with taking action with respect to any open issue to preserve resources and manpower for addressing other open issues requiring attention.

Traditionally, it has been difficult to assess how best to deploy resources to manage issues. For example, the monitored variables may only provide indirect information regarding which issues may need more resources deployed for management purposes (e.g., to meet resolution timeliness goals). Given the scale of many organizations and the volume of open issues that may need to be addressed, in many cases person-level analysis of the monitored variables to assess how to distribute limited resources for managing issues may not be sufficient to appropriately manage and deploy the limited resources.

Further, due to the proliferation of computing technology, the quantity of variables monitored for each issue has grown to the extent that the corpus of data monitored for any issue is beyond person-level analysis capabilities. Consequently, traditional person-focused analysis of open issues may no longer be a tractable approach in the era of ubiquitous computing and large-scale data collection.

Example embodiments may provide for the improvement of issue management in a distributed system. In contrast to conventional techniques that may rely on person-analysis of open issues, the disclosed example embodiments may facilitate issues management using a dashboard that allows managers of open issues to discriminate some open issues that may warrant more resources for management from other open issues that may warrant fewer resources for management. The dashboard may present, for example, graphical depictions of the relative significance of open issues with respect to the quantity of resources likely to be needed for management.

The dashboard may be populated using a scoring system. The scoring system may provide a framework for scoring each open issue. The scores may be used to populate the dashboard, thereby allowing for users of the dashboard to identify how to deploy resources for managing open issues to meet corresponding timeliness goals. Consequently, the cognitive burden on persons tasked with managing open issues in the distributed system may be greatly reduced while at the same time the efficiency of resource allocations may be enhanced.

In the example embodiments, the scoring system may be keyed to some of the variables monitored by the distributed system, while other variables monitored by the distributed system may be ignored by the scoring system. The variables to which the scoring system is keyed may be discriminated from the other variables based on an analysis of the likely predictive power of each of the variables. For example, historical monitoring for the variables and corresponding outcomes may be used to rank the predictive power of each of the variables. Over time, the scoring system may be updated, thereby allowing the scoring system and dashboard driven using the scoring system to adapt to changes in the distributed system over time.

Although a high level explanation of the operations of example embodiments has been provided above, specific details regarding the configuration of such example embodiments are provided below.

System Architecture

Example embodiments described herein may be implemented using any number and type of computing devices. To this end, FIG. 1 illustrates an example environment within which various embodiments may operate. As illustrated, the environment may include any number of data sources 110A-110N, user devices 120A-120N, and at least one issue management service 112.

The issue management service 112 may manage dashboards displayed to users of the user devices 120A-120N. The issue management service 112 may utilize data from any of the data sources 110A-110N to manage the dashboards. For example, the data sources 110A-110N may provide information usable to monitor variables for any number of issues.

The users of the user devices 120A-120N may utilize the dashboards to allocate resources for issue management. For example, the users of the user devices 120A-120N may utilize the dashboards to discriminate open issues to which resources should be deployed (e.g., unlikely to meet resolution timeliness goals) from other open issues to which resources need not be deployed (e.g., likely to naturally meet resolution timeliness goals).

Further, use of the user devices 120A-120N may utilize the dashboards to ascertain the quantities of resources that should be deployed to the open issues to which the resources should be deployed. For example, the dashboards may indicate both whether and the magnitude of resource need for the open issues (or, in some embodiments, only a portion of the open issues).

Turning to data sources 110A-110N, any of these components may be implemented using any number (one, many, etc.) and types of computing devices known in the art, such as desktop or laptop computers, tablet devices, smartphones, or the like.

The data sources 110A-110N may perform any type and quantity of data collection, analysis, and/or other functions to collect data that may be relevant to open issues in the distributed system. Data sources 110A-110N may provide the data (or a portion thereof) regarding the open issues to issue management service 112.

The user devices 120A-120N may be implemented using any number and types of computing devices known in the art, such as desktop or laptop computers, tablet devices, smartphones, or the like. The user devices 120A-120N may provide issue management services by, in part, displaying a dashboard to a user thereof, collecting feedback (e.g., input) from the user, and using the collected feedback to ascertain actions to perform to manage open issues (e.g., by selecting and/or deploying resources for management of the open issues).

The issue management service 112 may be implemented using any number (one, many, etc.) and types of computing devices known in the art, such as desktop or laptop computers, tablet devices, smartphones, or the like.

The issue management service 112 may provide for management of dashboards presented to users of the user devices 120A-120N. To do so, the issue management service 112 may collect information regarding open issues from the data sources 110A-110N, generate scores (and/or scoring systems using historic data and corresponding outcomes) for the open issues, and manage the generation and presentation of dashboards to users through the user devices 120A-120N.

To facilitate communications, any of the devices shown in FIG. 1 may be operably connected to each other with communications network 130. Communications network 130 may facilitate communications with one or more wired and/or wireless networks implemented using any suitable communications technology. In one embodiment, communications network 130 includes any number and type of transmission mediums (e.g., electrical cabling, optical cabling, free space channels, etc.) through which signals (e.g., electrical, optical, etc.) on which data is encoded are distributed amongst the devices. The communications network 130 may be implemented using any number and types of communication protocols.

Although FIG. 1 illustrates an environment and implementation in which various functionalities are performed by different devices, in some embodiments some or all of the functionalities of the data sources 110A-110N, user devices 120A-120N, and issue management service 112 are aggregated into a single device.

Example Implementing Apparatuses

Figure 2:
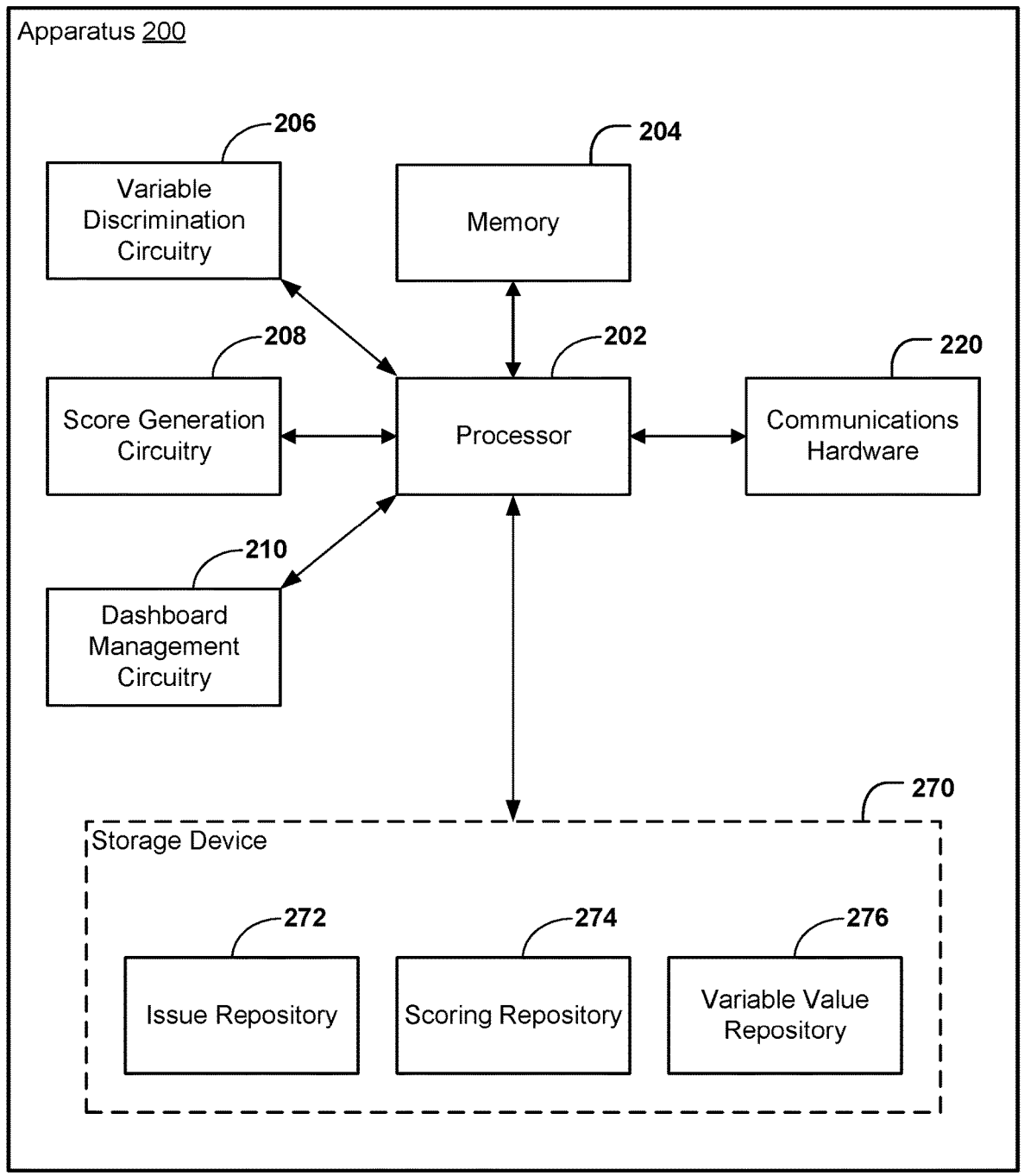
FIG. 2 illustrates a schematic block diagram of example circuitry embodying a device that may perform various operations in accordance with some example embodiments described herein.

Issue management service 112 may be embodied by one or more computing devices or servers, shown as apparatus 200 in FIG. 2. As illustrated in FIG. 2, the apparatus 200 may include processor 202, memory 204, variable discrimination circuitry 206, score generation circuitry 208, dashboard management circuitry 210, communications hardware 220, and storage device 270, each of which will be described in greater detail below. While the various components are only illustrated in FIG. 2 as being connected with processor 202, it will be understood that the apparatus 200 may further comprise a bus (not expressly shown in FIG. 2) for passing information amongst any combination of the various components of the apparatus 200. The apparatus 200 may be configured to execute various operations described above in connection with FIG. 1 and below in connection with FIGS. 5A-5D.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate or integrated storage device 270). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The variable discrimination circuitry 206 may be any means such as a device or circuitry embodied in either hardware or a combination of hardware and software that is configured to discriminate monitored variables of higher predict power with respect to issue outcomes from monitored variables of lower predictive power with respect to the issue outcomes. Variable discrimination circuitry 206 may utilize historical data regarding various issues (e.g., stored in issue repository 272 and/or obtained from data sources 110A-110N) to establish temporal relationships between monitored variables (e.g., during a first period of time) and an outcome regarding a corresponding issue (e.g., successful remediation, remediation failure, partial remediation, etc.). These relationships may be statistically analyzed to identify the relative predictive power of the monitored variables with respect to the issue outcomes to identify those monitored variables that are more predictive from those that are less predictive of the issue outcomes.

The score generation circuitry 208 may be any means such as a device or circuitry embodied in either hardware or a combination of hardware and software that is configured to obtain scoring systems. The scoring systems may be obtained using, for example, the discriminators obtained by the variable discrimination circuitry 206. For example, the score generation circuitry 208 may establish a scoring system based on a point system. The scoring system may specify that monitored variables having higher predictive power are to be ascribed more points (e.g., when encountered in future monitoring) than those with lower predictive power.

For example, consider a scenario where variable discrimination circuitry 206 identifies that a number of days an issue is unresolved exceeding a threshold for an open issue is more predictive with respect to an issue outcome than a date that the issue was opened. In such a scenario, the score generation circuitry 208 may specify that when another, similar issue is open for more than the threshold, the open issue should be ascribed 3 points and no points should be ascribed to the open issue regardless of when it was opened.

When a scoring system is generated, it may be stored in scoring repository 274 for future use. Scoring repository 274 may include any number of scoring systems. The scoring systems may be keyed to various types of issues such that issues may be scored differently by different scoring systems.

Figure 4:
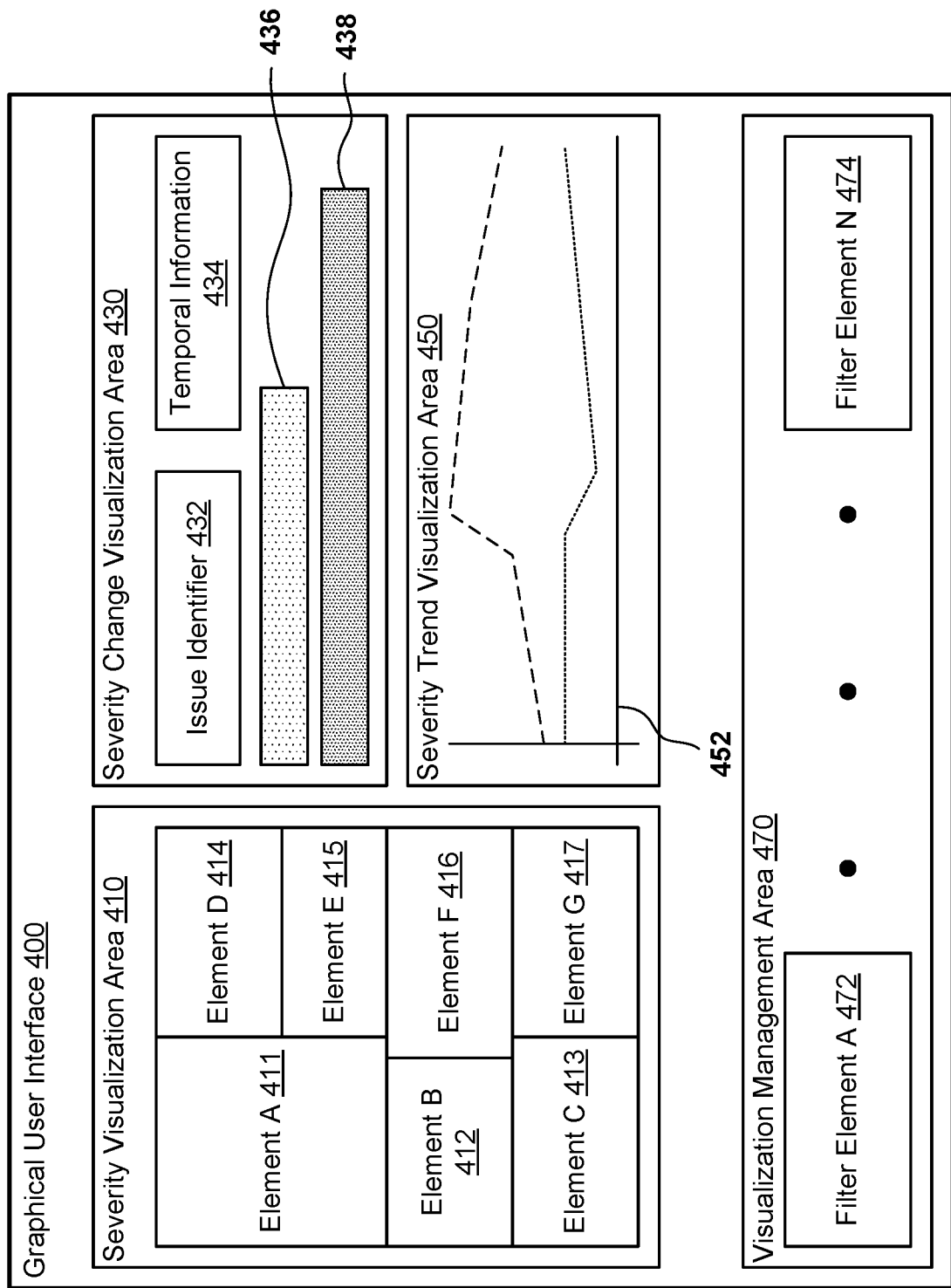
FIG. 4 illustrates a diagram of example graphical user interface that may be used by a system in accordance with some example embodiments described herein.

The dashboard management circuitry 210 may be any means such as one or more devices or circuitry embodied in either hardware or a combination of hardware and software that is configured to provide dashboard management services. Dashboard management services may include (i) obtaining data from one or more data sources to monitor variables associated with open issues, (ii) score, using scoring system, the open issues, and (iii) manage the generation and/or display of graphical user interfaces based on the scores associated with the open issues. The graphical user interfaces may, for example, display various areas that indicate the relative importance for allocating resources (e.g., quantities of resources) to address the open issues such that they are more likely to be timely resolved, changes in the relative importance of each of the issues, and/or trends regarding changes in the severity of the open issues. Refer to FIG. 4 and the corresponding disclosure, below, for additional details regarding graphical user interfaces.

The results of the scores of open issues may be stored in the variable value repository 276. The variable value repository 276 may reflect the score of each variable for an open issue. The variable value repository 276 may include current scores (e.g., from when an open issue was last scored) and/or historical scores so as to allow for trend and/or change identification over time.

To display graphical user interfaces, the dashboard management circuitry 210 may cooperate with user devices. For example, the dashboard management circuitry 210 may generate and/or provide data to user devices so that the user devices may generate and/or display the dashboards to users of the user devices. In doing so, the dashboard management circuitry 210 may invoke the functionality of communications hardware 220 to, for example, send data to the user devices. Likewise, data from data sources may be collected using the communications hardware 220 (e.g., by sending and/or receiving messages in which various portions of data are encapsulated).

The communications hardware 220 may be any means such as a device or circuitry embodied in either hardware or a combination of hardware and software that is configured to receive and/or transmit data from/to a network and/or any other device, circuitry, or module in communication with the apparatus 200. In this regard, the communications hardware 220 may include, for example, a network interface for enabling communications with a wired or wireless communication network. For example, the communications hardware 220 may include one or more network interface cards, data unit processors, antennas, buses, switches, routers, modems, and supporting hardware and/or software, or any other device suitable for enabling communications via a network. Furthermore, the communications hardware 220 may include the processing circuitry for causing transmission of such signals to a network or for handling receipt of signals received from a network.

Additionally, communications hardware 220 may include functionality to secure communications with, for example, encryption. The encryption may be applied at any layer of the network communication stack.

Finally, the apparatus 200 may include storage device 270 that stores data structures used by variable discrimination circuitry 206, score generation circuitry 208, dashboard management circuitry 210, and/or other components to provide their functionalities. Storage device 270 may be a non-transitory storage and include any number and types of physical storage devices (e.g., hard disk drives, tape drives, solid state storage devices, etc.) and/or control circuitry (e.g., disk controllers usable to operate the physical storage devices and/or provide storage functionality such as redundancy, deduplication, etc.). Any of the repositories 272, 274, 276 may be implemented using any number and types of data structures (e.g., database, lists, tables, linked lists, etc.).

Although components 202-270 are described in part using functional language, it will be understood that the particular implementations necessarily include the use of particular hardware. It should also be understood that certain of these components 202-270 may include similar or common hardware. For example, the variable discrimination circuitry 206, score generation circuitry 208, and/or dashboard management circuitry 210 may each at times leverage use of the processor 202, memory 204, communications hardware 220, and/or storage device 270, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although variable discrimination circuitry 206, score generation circuitry 208, and/or dashboard management circuitry 210 may leverage processor 202 or memory 204 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, or communications hardware 220 for enabling any functions not performed by special-purpose hardware elements. In all embodiments, however, it will be understood that the processor 202, memory 204, variable discrimination circuitry 206, score generation circuitry 208, dashboard management circuitry 210, communications hardware 220, and/or storage device 270 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Figure 3:
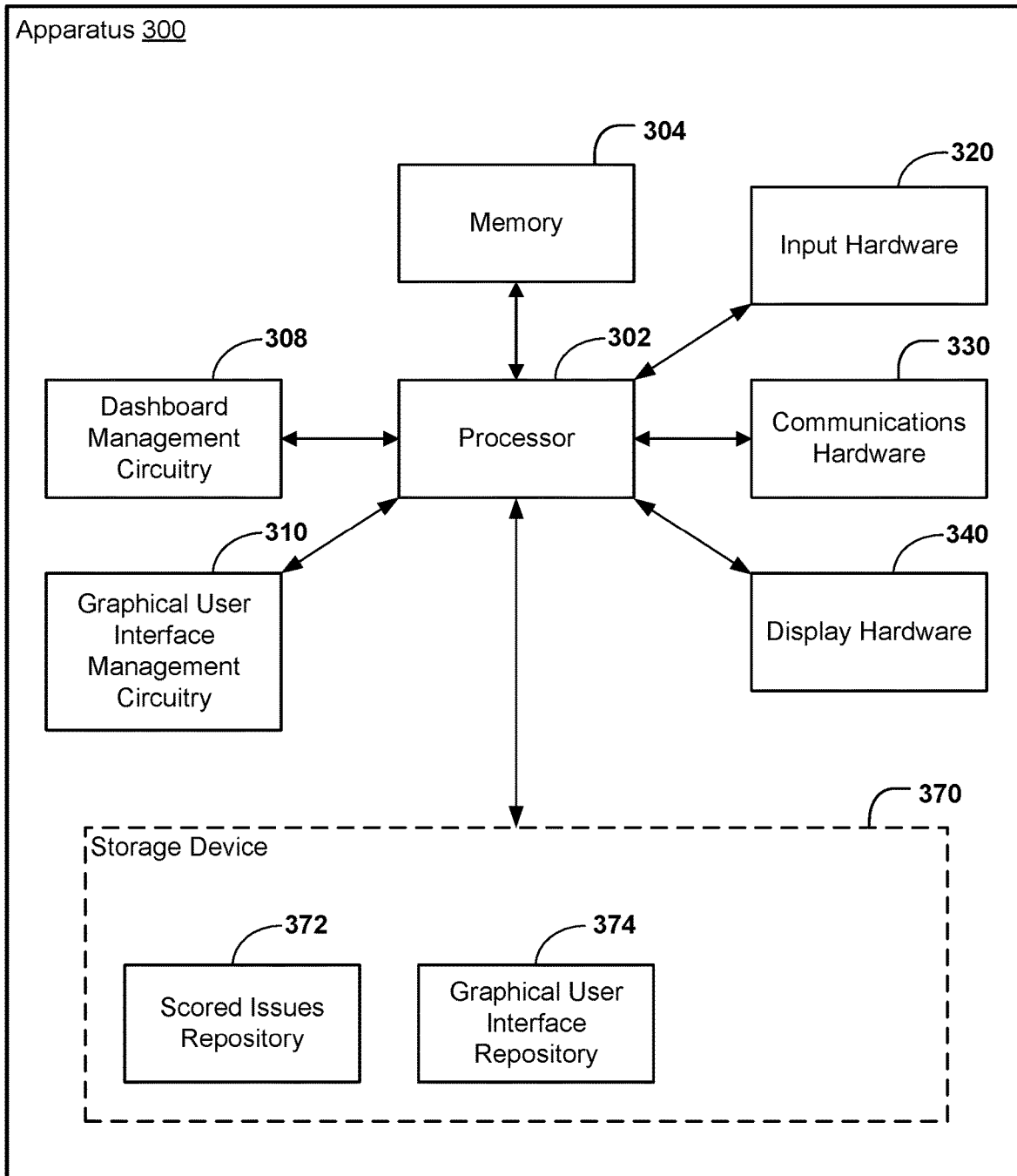
FIG. 3 illustrates a schematic block diagram of example circuitry embodying a device that may perform various operations in accordance with some example embodiments described herein.

Turning to FIG. 3, any of user devices 120A-120N may be embodied by one or more computing devices or servers, shown as apparatus 300 in FIG. 3. As illustrated in FIG. 3, the apparatus 300 may include processor 302, memory 304, dashboard management circuitry 308, graphical user interface management circuitry 310, input hardware 320, communications hardware 330, display hardware 340, and storage device 370, each of which will be described in greater detail below. While the various components are only illustrated in FIG. 3 as being connected with processor 302, it will be understood that the apparatus 300 may further comprises a bus (not expressly shown in FIG. 3) for passing information amongst any combination of the various components of the apparatus 300. The apparatus 300 may be configured to execute various operations described above in connection with FIG. 1 and below in connection with FIGS. 5A-5D.

The processor 302 (and/or co-processor or any other processor assisting or otherwise associated with the processor) may be in communication with the memory 304 via a bus for passing information amongst components of the apparatus. The processor 302 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 300, remote or "cloud" processors, or any combination thereof.

The processor 302 may be configured to execute software instructions stored in the memory 304 or otherwise accessible to the processor (e.g., software instructions stored on a separate or integrated storage device 370). In some cases, the processor may be configured to execute hard-coded functionality. As such, whether configured by hardware or software methods, or by a combination of hardware with software, the processor 302 represent an entity (e.g., physically embodied in circuitry) capable of performing operations according to various embodiments of the present invention while configured accordingly. Alternatively, as another example, when the processor 302 is embodied as an executor of software instructions, the software instructions may specifically configure the processor 302 to perform the algorithms and/or operations described herein when the software instructions are executed.

Memory 304 is non-transitory and may include, for example, one or more volatile and/or non-volatile memories. In other words, for example, the memory 304 may be an electronic storage device (e.g., a computer readable storage medium). The memory 304 may be configured to store information, data, content, applications, software instructions, or the like, for enabling the apparatus to carry out various functions in accordance with example embodiments contemplated herein.

The dashboard management circuitry 308 may be any means such as a device or circuitry embodied in either hardware or a combination of hardware and software that is configured to provide dashboard management services. Dashboard management services may include (i) obtaining data from a service usable to generate a dashboard, (ii) storing the obtained data in a scored issues repository 372, and (iii) invoking the functionality of graphical user interface management circuitry 310 to display graphical user interfaces to users of apparatus 300 to present dashboards to the users.

The graphical user interface management circuitry 310 may be any means such as a device or circuitry embodied in either hardware or a combination of hardware and software that is configured to provide graphical user interface services. Graphical user interface services may include (i) generating graphical user interfaces based on information in scored issues repository 372, (ii) invoking the functionality of display hardware 340 to display a graphical user interface to a user, (iii) invoking the functionality of input hardware 320 to obtain input from a user which may be based on a display of a graphical user interface, and/or (iv) initiating performance of one or more actions based on the user input. The one or more actions may facilitate, for example, deployment of resources to manage open issues.

When generating graphical user interfaces, graphical user interface management circuitry 310 may utilize information from graphical user interface repository 374. Graphical user interface repository 374 may include information such as, for example, templates for generating graphical user interfaces, instructions on how to generate graphical user interfaces, and/or other types of information regarding graphical user interface generation.

The input hardware 320 may be any means such as a device or circuitry embodied in either hardware or a combination of hardware and software that is configured to obtain input from a user. For example, the input hardware 320 may include a touch sensitive screen, a pointing device, a keyboard, and/or other hardware through which a user of the apparatus 300 may provide information to the apparatus 300.

The communications hardware 330 may be any means such as a device or circuitry embodied in either hardware or a combination of hardware and software that is configured to receive and/or transmit data from/to a network and/or any other device, circuitry, or module in communication with the apparatus 300. In this regard, the communications hardware 330 may include, for example, a network interface for enabling communications with a wired or wireless communication network. For example, the communications hardware 330 may include one or more network interface cards, data unit processors, antennas, buses, switches, routers, modems, and supporting hardware and/or software, or any other device suitable for enabling communications via a network. Furthermore, the communications hardware 330 may include the processing circuitry for causing transmission of such signals to a network or for handling receipt of signals received from a network.

The display hardware 340 may be any means such as a device or circuitry embodied in either hardware or a combination of hardware and software that is configured to provide display information to users. For example, the display hardware 340 may include a display including one or more pixels, a display adapter, and/or other components. The display hardware 340 may display any type and quantity of information to a user, such as, for example, a graphical user interface generated by graphical user interface management circuitry 310.

Finally, the apparatus 300 may include storage device 370 that stores data structures used by dashboard management circuitry 308 and graphical user interface management circuitry 310 to provide their functionalities. Storage device 370 may be a non-transitory storage and include any number and types of physical storage devices (e.g., hard disk drives, tape drives, solid state storage devices, etc.) and/or control circuitry (e.g., disk controllers usable to operate the physical storage devices and/or provide storage functionality such as redundancy, deduplication, etc.). Any of the repositories 372, 374 may be implemented using any number and types of data structures (e.g., database, lists, tables, linked lists, etc.).

While illustrated in FIG. 3 as being a part of apparatus 300, the storage device 370 may be a part of a different device operably connected to apparatus 300.

Although components 302-370 are described in part using functional language, it will be understood that the particular implementations necessarily include the use of particular hardware. It should also be understood that certain of these components 302-370 may include similar or common hardware. For example, the dashboard management circuitry 308 and graphical user interface management circuitry 310 may each at times leverage use of the processor 302, memory 304, input hardware 320, communications hardware 330, display hardware 340, and/or storage device 370, such that duplicate hardware is not required to facilitate operation of these physical elements of the apparatus 300 (although dedicated hardware elements may be used for any of these components in some embodiments, such as those in which enhanced parallelism may be desired). Use of the terms "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 300 to perform the various functions described herein.

Although dashboard management circuitry 308 and graphical user interface management circuitry 310 may leverage processor 302 or memory 304 as described above, it will be understood that any of these elements of apparatus 300 may include one or more dedicated processor, specially configured field programmable gate array (FPGA), or application specific interface circuit (ASIC) to perform its corresponding functions, and may accordingly leverage processor 302 executing software stored in a memory (e.g., memory 304), memory 304, input hardware 320, communications hardware 330, or display hardware for enabling any functions not performed by special-purpose hardware elements. In all embodiments, however, it will be understood that the processor 302, memory 304, input hardware 320, communications hardware 330, display hardware 340, and storage device 370 are implemented via particular machinery designed for performing the functions described herein in connection with such elements of apparatus 300.

In some embodiments, various components of the apparatus 300 may be hosted remotely (e.g., by one or more cloud servers) and thus need not physically reside on the corresponding apparatus 300. Thus, some or all of the functionality described herein may be provided by third party circuitry. For example, a given apparatus 300 may access one or more third party circuitries via any sort of networked connection that facilitates transmission of data and electronic information between the apparatus 300 and the third party circuitries. In turn, that apparatus 300 may be in remote communication with one or more of the other components describe above as comprising the apparatus 300. For example, display hardware 340 may be remote to the other components of apparatus 300.

As will be appreciated based on this disclosure, example embodiments contemplated herein may be implemented by an apparatus 300. Furthermore, some example embodiments may take the form of a computer program product comprising software instructions stored on at least one non-transitory computer-readable storage medium (e.g., memory 304). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 300 as described in FIG. 3, that loading the software instructions onto a computing device or apparatus produces a special-purpose machine comprising the means for implementing various functions described herein.

Having described specific components of example apparatuses 200 and 300, example embodiments are described below.

Example Graphical User Interface

Turning to FIG. 4, an example diagram of a graphical user interface 400 in accordance with one or more embodiments is shown. The graphical user interface 400 may be displayed to a user via a display. The graphical user interface 400 may be based on scores for open issues. The scores may be obtained with a scoring system that provides scores for open issues based on monitored variables associated with the respective open issues.

The graphical user interface 400 may provide with a view of the interface with information regarding the relative severity, changes in severity, trends in the severity, and/or other types of information regarding open issues. This information may be utilized by a user and/or an automated process to manage allocation of resources for managing the open issues.

The graphical user interface 400 may include multiple areas 410, 430, 450, 470 which may display different visualizations. A severity visualization area 410 may be an area in which any number of elements 411-417 are displayed. The elements 411-417 may correspond to open issues. The size, color, and/or characteristics of the elements 411-417 may be based on a score for the corresponding open issue. Each of the elements 411-417 may also include an identifier of the open issue or other type of information such that a viewer of the severity visualization area 410 may associate different elements with different open issues. Similarly, the other characteristics (e.g., size, color, etc.) may convey a magnitude of the severity of each of the respective issues. The severity may correspond to the score for the corresponding open issue. Thus, when a user views the severity visualization area 410, the user may be made aware of the severity of open issues (all, or a portion) and allow the user to compare the relative severity level of the open issues with respect to one another.

A severity change visualization area 430 may be an area in which information regarding changes in the severity (e.g., score) for an open issue over time is displayed. The severity change visualization area 430 may include an issue identifier 432 (e.g., to information a user of the open issue for which information is displayed), temporal information 434 (e.g., a time period over which a change in severity has occurred), and comparative elements 436, 438 that may indicate the severity of an open issue at different points in time. For example, comparative elements 436, 438 may include a color and/or size that indicates the severity of the open issue identified by the issue identifier 432 at different points of time specified by temporal information 434. In an embodiment, the comparative elements 436, 438 are implemented with bars having widths that are longer when an issue is more sever and a color that is darker when an issue is more sever. In FIG. 4, comparative element 438 is illustrated as having such characteristics indicating that the severity of the open issue was greater than at the point in time associated with the other comparative element 436.

A severity trend visualization area 450 may be an area in which information regarding severity trends for open issues (one or more) over time is displayed. For example, severity trend visualization area 450 may include a chart 452 or other type of graphical element that indicates changes in issue severity over time. The chart 452 may include a first line (illustrated in longer dashing) that indicates the aggregate (e.g., mean, median, mode, or other statistical characteristic of all or a portion of the open issues) severity of the open issues over a period of time and a second line that indicates the rate of change in the aggregate severity of the open issues over a period of time.

A visualization management area 470 may be an area in which any number of filter elements 472-474 are displayed and used to manage the contents of the other visualization areas. For example, the filter elements 472-474 may present information regarding which open issues are being visualized in the other visualization areas and controls for modifying these other areas. The filter elements 472-474 may allow a user to selectively view information regarding some or all of the open issues. Consequently, a user may utilize the visualization management area 470 to modify the content the other visualization areas display to a user. For example, a user may utilize an input device to modify how the other visualization areas are being generated (e.g., by selecting or otherwise specifying open issues on which the other visualization areas are to be based).

To implement the graphical user interface 400, or portions thereof, one or more templates may be used that includes, for example, placeholders which may be populated using information from a scored issues repository. Once populated, the resulting graphical user interface may be similar to that shown in FIG. 4. Any of the various areas may of the graphical user interface 400 may be scaled or otherwise modified to meet pixel and/or display dimension limitations.

While the graphical user interface 400 has been illustrated as including a specific number and type of areas, a graphical user interface in accordance with embodiments disclosed herein may include additional, fewer, and/or different areas (e.g., that may include different visualizations) than those shown in FIG. 4.

Example Apparatus Operations for Issue Management

Turning to FIGS. 5A-5D, example flowcharts are illustrated that contain example operations implemented by various embodiments described herein. FIGS. 5A-5D illustrate example operations for managing open issues using dashboards.

The operations illustrated in FIGS. 5A-5C may, for example, be performed by an issue management service 112 shown in FIG. 1, which may in turn be embodied by an apparatus 200, which is shown and described in connection with FIG. 2. To perform the operations described below, the apparatus 200 may utilize one or more of processor 202, memory 204, variable discrimination circuitry 206, score generation circuitry 208, dashboard management circuitry 210, communications hardware 220, storage device 270, and/or any combination thereof.

Figure 5A:
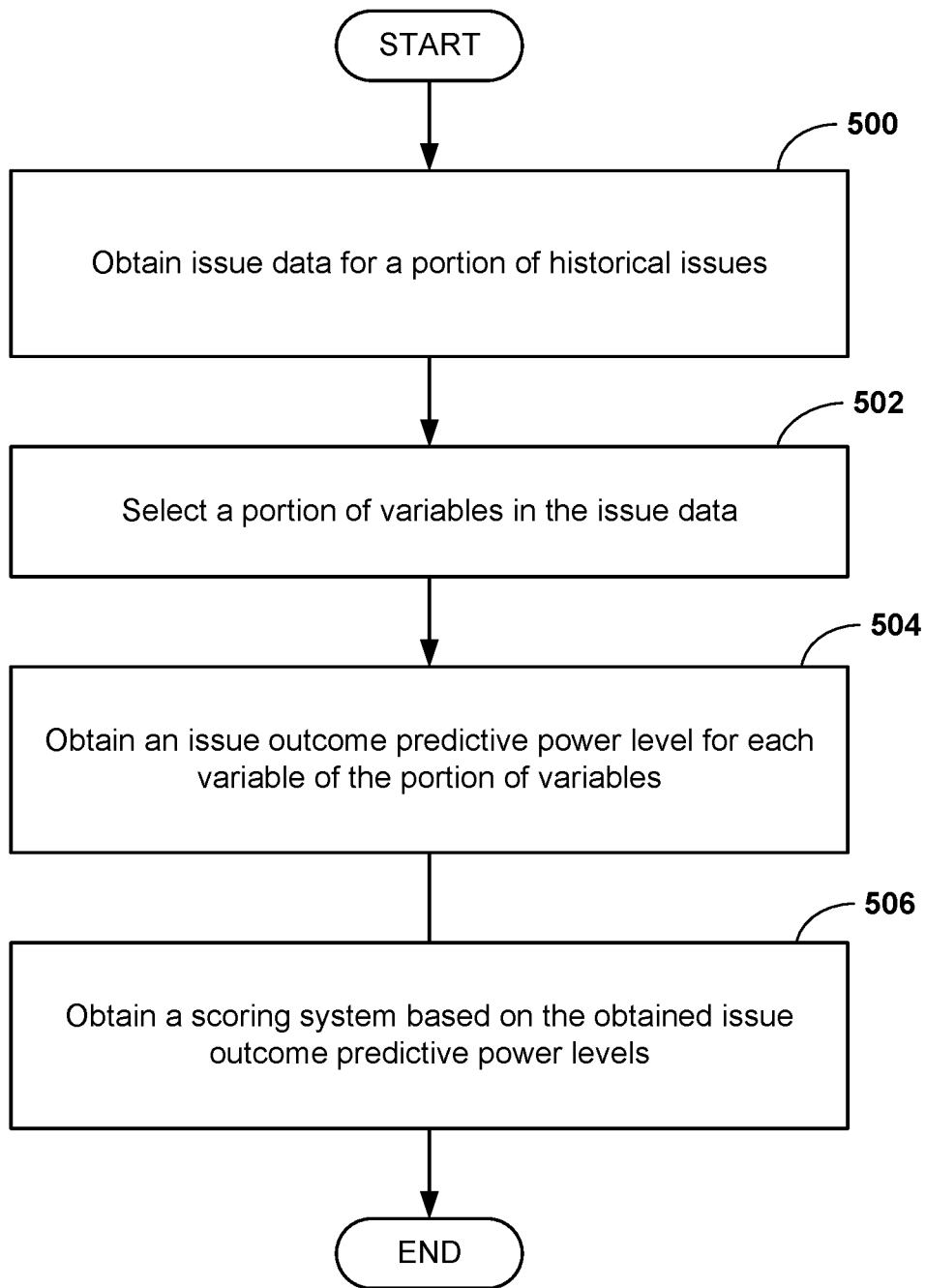
FIG. 5A illustrates an example flowchart for obtaining a scoring system, in accordance with some example embodiments described herein.

Turning first to FIG. 5A, example operations are shown for obtaining a scoring system. The obtained scoring system may be used to score open issues.

As shown by operation 500, the apparatus 200 includes means, such as processor 202, memory 204, variable discrimination circuitry 206, score generation circuitry 208, dashboard management circuitry 210, and communications hardware 220 or the like, for obtaining issue data for a portion of historical issues. The issue data may be obtained from any number of data sources. The issue data may specify relationships between monitored variables and subsequently occurring issue outcomes. The issue outcomes may be, for example, whether an issue was timely resolved, was not timely resolved, etc. The monitored variables and issues outcomes may be related temporarily to one another. For example, the monitored variables may have been monitored earlier in time and the issue outcome may have occurred later in time. The issue data may include any number of such relationships between monitored variables and corresponding issue outcomes.

As shown by operation 502, the apparatus 200 includes means, such as processor 202, memory 204, variable discrimination circuitry 206, score generation circuitry 208, dashboard management circuitry 210, and communications hardware 220 or the like, for selecting a portion of variables in the issue data. The variables may be selected based on heuristic data, expert interpretations, numerical analysis, and/or other factors. The selected variables may be a portion of the monitored variables in the issue data obtained at operation 500.

In an embodiment, other variables (e.g., not part of the portion) may not be ascribed any weight for scoring purposes. For example, the other variables may be treated as ascribing 0 points to an open issue, even if the open issue has a monitored variable in a similar range or having other similar characteristics. The 0 point values may be ascribed so that variables having little predictive value do not impact open issue scoring in a manner that may divert resources way from higher severity issues to lower severity issues. In contrast, the variables in the portion of the variables may be ascribed non-zero weights. In other words, as discussed below, various quantities of points may be awarded by a scoring system to open issues having similar monitored variables (e.g., of similar value).

In an embodiment, the portion of the variables is a minority of the variables while the other variables are a majority of the variables. In this manner, the resulting scores for the open issues may only be based on a small, tractable amount of the monitored variables.

For example, the monitored variables may be subjected to multivariate analysis to identify a subset of the monitored variables that appear to be correlated with issue outcomes.

In another example, domain experts (e.g., persons with experience regarding the open issues in the obtained issue data) may interpret the monitored variables and select one or more of them based on their expertise. Different domain experts may interpret different open issues and/or different monitored variables in the issue data.

As shown by operation 504, the apparatus 200 includes means, such as processor 202, memory 204, variable discrimination circuitry 206, score generation circuitry 208, dashboard management circuitry 210, and communications hardware 220 or the like, for obtaining issue outcome predictive power levels for the variables of the portions of the variables. The issue outcome predictive power levels may be obtained by, for example, performing summary analysis, population stability index analysis, weight of evidence analysis, and/or information value analysis of the issue data associated with the portion of the variables to identify how strongly each of the variables is correlated with the issue outcome.

For example, summary analysis may include utilizing quantitative techniques to assess the quality of the monitored variables over time to identify variables that have little predictive power (e.g., little change with respect to different issue outcomes).

In another example, the population stability index analysis may include measuring how the monitored variables shift over time with respect to changes in issue outcome.

In a further example, the weight of evidence analysis may include identifying the predictive power of each monitored variable with respect to the associated issue outcomes.

In an additional example, the information value may include quantifying the predictive power of each of the monitored variables with respect to one another to obtain numerical values (e.g., the issue outcome predictive power levels) for each monitored value. Larger numerical values may indicate better predictive power.

As shown by operation 506, the apparatus 200 includes means, such as processor 202, memory 204, variable discrimination circuitry 206, score generation circuitry 208, dashboard management circuitry 210, and communications hardware 220 or the like, for obtaining a scoring system based on the obtained issue outcome predictive power levels. For example, a range over which scoring values will be provided may be defined (e.g., a 0 to 100-point scale), and the issue outcome predictive power levels may be scaled based on the defined range to obtain the scoring system.

For example, if the issue outcome predictive power levels specify a value of 0.3 for a first monitored variable and a value of 0.5 for a second monitored variable, then the scoring system (e.g., scaled to a 100-point scale) may specify that 30 points should be awarded to an open issue when its corresponding monitored variable is similar to that of the first monitored variable associated with the issue data. Similarly, 50 points may be awarded to the open issue when its corresponding second monitored variable is similar to that of the second monitored variable associated with the issue data.

In an embodiment, the scoring system may specify scoring ranges for some or all of the monitored variables. For example, the scoring system may specify different quantities of points for ranges over which a monitored variable may vary.

In an embodiment, the scoring system specifies at least one scoring range for a monitored variable. For example, the scoring system may specify different quantities of points for different ranges over which a monitored variable may vary. For example, for a variable such as the duration that an open issue has remained open, the scoring system may specify different quantities of points (e.g., 2 for 365-620 days, 3 for more than 620 days) for different durations over which the open issue has remained open.

In an embodiment, the scoring system specifies at least one scoring threshold for a monitored variable. For example, the scoring system may specify a quantity of points to be ascribed when a monitored variable meets and/or exceeds a threshold. For example, for a variable such as risk level, the scoring system may specify that three points should be ascribed to the open issue if the open issue has a monitored variable indicating that the risk level is critical or high (e.g., a threshold of high) whereas lesser threat levels such as moderate should not be ascribed any points.

In an embodiment, the scoring system specifies at least one scoring type for a monitored variable. For example, the scoring system may specify a quantity of points to be ascribed when a monitored variable is of a particular type. For example, for a variable such as root cause of the open issue, the scoring system may specify that two points should be ascribed to the open issue if the open issue has a monitored variable indicating that management is the root cause where in contrast no points should be ascribed if other root causes are indicated by the monitored variable.

In an embodiment, the scoring system specifies at least one scoring rule that specifies a plurality of ranges of open issues days and corresponding quantities of points for the ranges. For example, the scoring rule may specify that three points are ascribed to an open issue when a number of days an open issue is open exceeds 628 days (or another threshold within 10% of 628 days), two points are ascribed to the open issue when a number of days the open issue is between 484 and 627 days (or other delineations within 10% of 484 and 627, respectively), and no points are ascribed when an open issue is open for less than 484 days (or another threshold within 10% of 484 days).

In an embodiment, the scoring system specifies at least one scoring rule that specifies a threshold for quantity of times a period for remediating an open issue has been extended and a corresponding quantity of points when the threshold is exceeded. For example, the threshold may be one extension, two extensions, three extensions, etc. The quantity of points may be three points.

In an embodiment, the scoring system specifies at least one scoring rule that specifies a list of classifications for an open issue and a corresponding quantity of points when the open issues is classified as one of the classifications in the list of classifications. The list may include classifications related to regulatory compliance that, if not met, may cause an organization to be administratively penalized with fines or other means. The list of classifications may include one or more of the following classifications: a matter requiring attention, a matter requiring immediate attention, an escalated matter requiring attention. A matter requiring attention may be a type of requirement imposed by a banking regulator that if not complied with may allow the banking regulator to impose penalties and/or other requirements on a banking institution. The quantity of points may be three points.

In an embodiment, the scoring system specifies at least one scoring rule that specifies a threshold for a number of related corrective actions being performed that may be impacted by an open issue and a corresponding quantity of points when the threshold is exceeded. For example, the threshold may be one related corrective action, two related corrective actions, three related corrective actions, etc. The quantity of points may be three points.

In an embodiment, the scoring system specifies at least one scoring rule that specifies ranges for a number of corrective actions being performed and that are associated with an open issue, and corresponding quantities of points for the ranges. For example, the scoring rule may specify that three points are ascribed to an open issue when a number of corrective actions being performed and associated with the open issue is exceeds three, two points are ascribed to the open issue when one or two corrective actions associated with the open issue are being performed, and no points when no corrective actions associated with the open issue are being performed.

In an embodiment, the scoring system specifies at least one scoring rule that specifies a list of risk ratings for an open issue and a corresponding quantity of points when the open issues is associated with the risk ratings in the list. The list of risk ratings may include one or more of the following: operational risk-financial reporting risk, operational risk—information security risk—identity and access management risk, and strategic risk—strategic planning risk. An open issue having any of these risks may be ascribed one point per each of the risks.

In an embodiment, the scoring system specifies at least one scoring rule that specifies a list of reporting impacted by an open issue and a corresponding quantity of points when the open issues is associated with the impacted reporting. The list of impacted reporting may include one or more of the following: a first set including regulatory reporting—security and exchange committee reporting—international regulatory reporting; and a second set including regulatory reporting—security and exchange committee reporting, regulatory reporting—security and exchange committee reporting—international regulatory reporting. An open issue having any of these the first set of impacted reporting may be ascribed two points while an open issue having any of the second set of impacted reporting may be ascribed one point.

In an embodiment, the scoring system specifies at least one scoring rule that specifies a risk level for an open issue and a corresponding quantity of points. The risk level may be critical or high. The quantity of points may be three points.

In an embodiment, the scoring system specifies at least one scoring rule that specifies a risk cause for an open issue and a corresponding quantity of points. The risk cause may be management. The quantity of points may be two points.

In an embodiment, the scoring system specifies at least one scoring rule that specifies a list of sources of an open issue and a corresponding quantity of points for various sources. The list of sources may include one or more of the following: a foreign agency, an office of the comptroller of the currency, and an entity that is managing the open issues. The quantity of points may be three points for a foreign agency, two points for an office of the comptroller of the currency, and one point for the entity.

In an embodiment, the scoring system specifies at least one scoring rule that specifies a list of notifications types of an open issue and a corresponding quantity of points for various notification types. The list of notification types may include one or more of the following: a letter and an electronic mail. The quantity of points may be two points for a letter and one point for an electronic mail.

In an embodiment, the scoring system specifies at least one scoring rule that specifies a list of types of sources of an open issue and a corresponding quantity of points for the various types of the sources. The list of types of sources may include one or more of the following: a regulatory examiner (e.g., a bank inspector), a private auditor, and an entity that is managing the open issues. The quantity of points may be two points for a regulatory examiner, and one point for the private auditor or the entity.

The aforementioned scoring rules may be, for example, aggregated in a data structure and stored in a scoring repository 274.

The method may end following operation 506.

The method illustrated in FIG. 5A, or portions thereof, may be repeated over time. When so repeated, the scoring rules may change to match changes in open issues over time. Consequently, a scoring system may dynamically change over time to provide relevant graphical user interfaces for resources allocation purposes to address open issues.

Figure 5B:
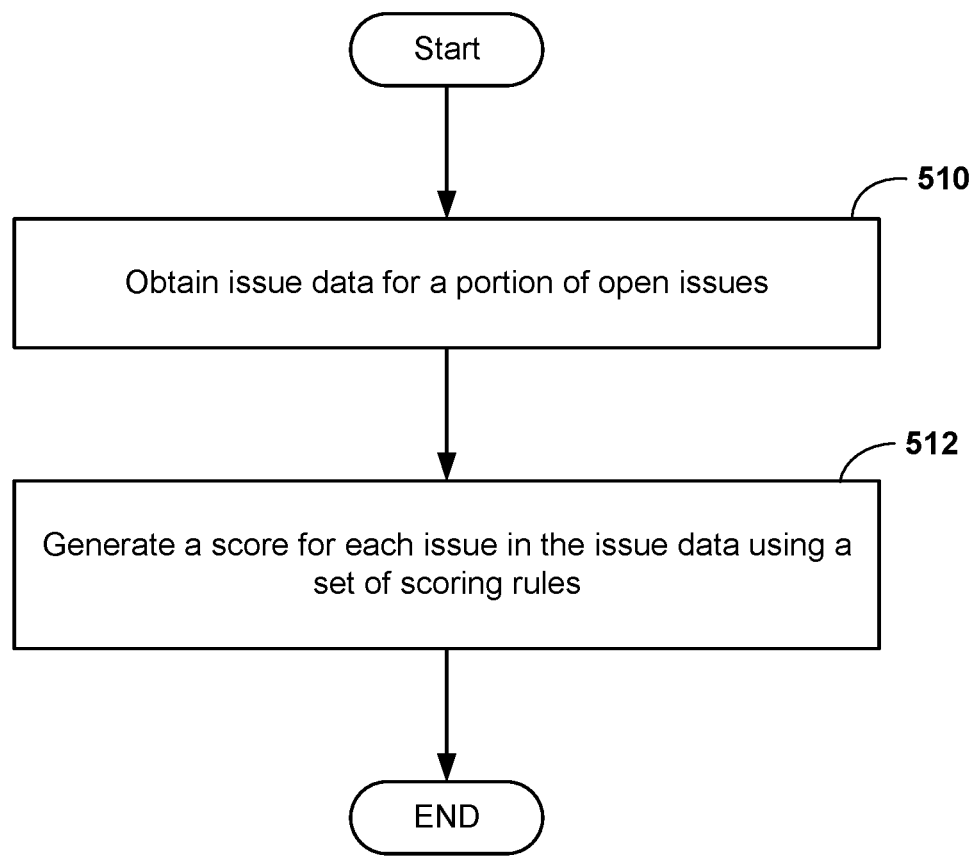
FIG. 5B illustrates an example flowchart for obtaining scores for open issues using a scoring system, in accordance with some example embodiments described herein.

Turning first to FIG. 5B, example operations are shown for scoring open issues. The obtained scores may be used to generate a dashboard, may be used to drive downstream management purposes, and/or for other purposes.

As shown by operation 510, the apparatus 200 includes means, such as processor 202, memory 204, variable discrimination circuitry 206, score generation circuitry 208, dashboard management circuitry 210, and communications hardware 220 or the like, for obtaining issue data for a portion of open issues. The issue data may be obtained obtain, for example, from one or more data sources, from a repository, and/or from other sources. The issue data may be obtained in response to a request (e.g., from a user device) for scores for the portion of open issues. The portion may include all, or only some, of the open issues for which the issue management service may monitor variables corresponding to the open issues, and/or manage the open issues.

The issue data may include values for variables corresponding to each of the open issues. For example, the issue data may include, for an open issue, any of the monitored variables for which a scoring system is prepared to operate on to generate scores. Refer to FIG. 5A and the corresponding description for details regarding scoring systems.

As shown by operation 512, the apparatus 200 includes means, such as processor 202, memory 204, variable discrimination circuitry 206, score generation circuitry 208, dashboard management circuitry 210, and communications hardware 220 or the like, for generating a score for each issues in the issue data using a set of scoring rules. The scores may be obtained by (i) calculating a score for each of the monitored variables for each of the open issues in the portion of the open issues and (ii) for each open issue, summing the scores for its monitored variables.

For example, consider a scenario where an open issue is associated with three monitored variables that are ascribed separate scores of 1, 2, and 3, respectively. In this scenario, the score for the open issue may be 6.

The generated score for each open issue may be stored in a repository for later use, may be distributed to an entity that prompted the issue data to be obtained, and/or may be used for other purposes such as driving downstream management processes.

The method may end following operation 512.

Figure 5C:
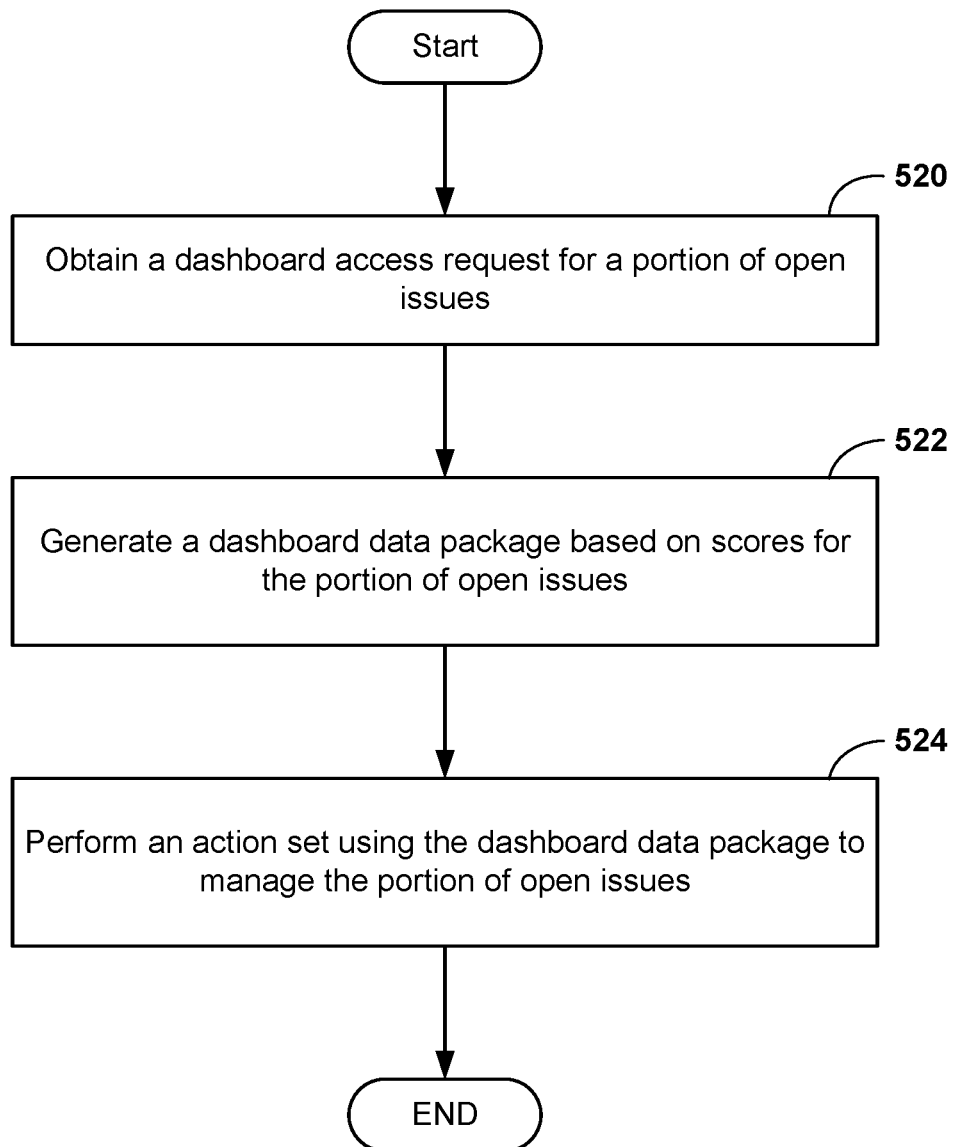
FIG. 5C illustrates an example flowchart for managing open issues, in accordance with some example embodiments described herein.

Turning next to FIG. 5C, example operations are shown for managing open issues. The open issues may be managed, for example, by presenting scores for the open issues in an easily digestible format, obtaining input from a user having digested the open issues, and using the input to perform one or more actions to manage the open issues. For example, the input may be utilized to ascertain how to deploy limited resources for issue management in a manner that is more likely to cause the issues to be remediated within prescribed time limits for remediation.

As shown by operation 520, the apparatus 200 includes means, such as processor 202, memory 204, variable discrimination circuitry 206, score generation circuitry 208, dashboard management circuitry 210, and communications hardware 220 or the like, for obtaining a dashboard access request. The dashboard access request may be obtained by receiving it in one or more messages from a user device or another entity. The request may specify the portion of open issues.

As shown by operation 522, the apparatus 200 includes means, such as processor 202, memory 204, variable discrimination circuitry 206, score generation circuitry 208, dashboard management circuitry 210, and communications hardware 220 or the like, for generating a dashboard data package based on scores for the portion of open issues. The scores for the portion of the open issues may be obtained from a repository or may be calculated in response to obtaining the dashboard request. The scores may reflect current scores based on up to date monitored variables for the open issues.

The dashboard data package may be obtained by aggregating the scores into a list. The list may include any number of entries which may respectively specify (i) an identity of an open issue, (ii) a score for the open issue (or scores corresponding to any number of variables which may be aggregated or otherwise used to obtain the score for the open issue), and/or (iii) other information regarding the open issue. The dashboard data package may be implemented with other types of data structures (e.g., tables, linked lists, unstructured data, etc.) without departing from embodiments disclosed herein.

As shown by operation 524, the apparatus 200 includes means, such as processor 202, memory 204, variable discrimination circuitry 206, score generation circuitry 208, dashboard management circuitry 210, and communications hardware 220 or the like, for performing an action set using the dashboard data package to manage the portion of the open issues. The action set may include (i) presenting a graphical user interface based on the scores from the dashboard data package to a user, (ii) obtaining input from the user based on the graphical user interface, (iii) using the input to select one or more actions, and/or (iv) performing the one or more selected actions to manage the portion of the open issues.

The portions of the open issues may be managed by allocating resources to the respective open issues based on the input from the user. For example, the input may indicate persons and/or time of persons to be spent managing the respective open issues. The input may be added to a personnel management system such that the persons spend their time managing the respective open issues accordingly. In this manner, limited resources may be allocated to the respective open issues in a time and resources efficient manner.

The input from the user may be obtained, for example, using an input device such as a touch sensitive display, mouse, or other type of pointing/input device. Any quantity of input may be obtained.

The graphical user interface may be presented to the user by (i) providing a user device with the dashboard data package and (ii) invoking functionality of the user device to generate and/or present the user interface. The user device may also obtain the input from the user and provide the input to the issue management system (or may act as the issue management system and allow for resources to be allocated accordingly).

Figure 5D:
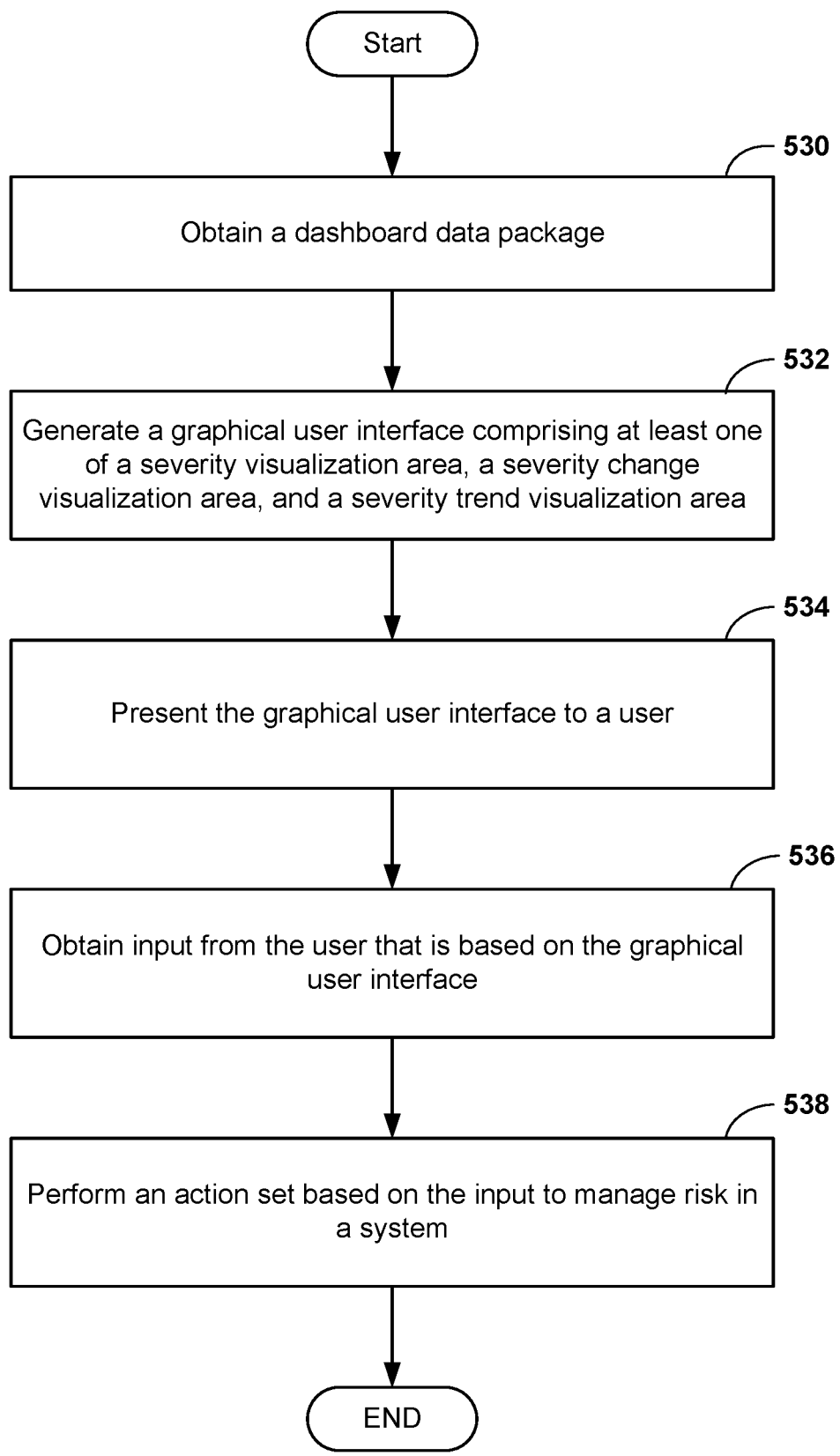
FIG. 5D illustrates an example flowchart for managing risk in a distributed system, in accordance with some example embodiments described herein.

For additional details regarding generation and/or presentation of user interfaces to users, refer to FIG. 5D.

The method may end following operation 524.

The operations illustrated in FIG. 5D may, for example, be performed by any user device 120A-120N shown in FIG. 1, which may in turn be embodied by an apparatus 300, which is shown and described in connection with FIG. 3. To perform the operations described below, the apparatus 300 may utilize one or more of processor 302, memory 304, dashboard management circuitry 308, Graphical user interface management circuitry 310, input hardware 320, communications hardware 330, display hardware 340, storage device 370, and/or any combination thereof.

Turning to FIG. 5D, example operations are shown for managing risk in a system. The risk may be due to the presence of open issues that may need to be resolved to manage the risk. The system may only include a finite quantity of resources for managing the risks and, consequently, the resources may need to be rationed to manage the risk in the system.

As shown by operation 530, the apparatus 300 includes means, such as processor 302, memory 304, dashboard management circuitry 308, Graphical user interface management circuitry 310, input hardware 320, communications hardware 330, display hardware 340, and storage device 370 or the like, for obtaining a dashboard data package. The dashboard data package may specify any quantity of scores for any quantity of open issues.

The dashboard data package may be obtained by sending a request for it to an issue management service. The request may specify open issues for which scores are being requested. The issue management system may generate the dashboard data package and provide it (e.g., via one or more messages) to a user device.

As shown by operation 532, the apparatus 300 includes means, such as processor 302, memory 304, dashboard management circuitry 308, Graphical user interface management circuitry 310, input hardware 320, communications hardware 330, display hardware 340, and storage device 370 or the like, for generating a graphical user interface. The graphical user interface may include one or more areas such as, for example, a severity change visualization area, a severity visualization area, and/or a severity trend visualization area. The dashboard may be similar to that described with respect to and shown in FIG. 4.

In an embodiment, the dashboard is generated by populating a template using the dashboard data package. For example, scores from the dashboard data package may be utilized to generate the various graphical elements described with respect to FIG. 4.

As shown by operation 534, the apparatus 300 includes means, such as processor 302, memory 304, dashboard management circuitry 308, Graphical user interface management circuitry 310, input hardware 320, communications hardware 330, display hardware 340, and storage device 370 or the like, for presenting the graphical user interface to a user. The graphical user interface may be presented it by displaying it on a display (e.g., of the user device or another device) viewed or otherwise available for viewing by a user.

As shown by operation 536, the apparatus 300 includes means, such as processor 302, memory 304, dashboard management circuitry 308, Graphical user interface management circuitry 310, input hardware 320, communications hardware 330, display hardware 340, and storage device 370 or the like, for obtaining input from the user. The input may be based on the graphical user interface. For example, a user may view the graphical user interface to obtain information regarding the severity of various issues thereby allowing the user to make informed decisions regarding which open issues may be more severe than other open issues. The user may desire to obtain this information to make informed resource allocation decisions.

In an embodiment, the user interface provides the user with highly consolidated information regarding the severity of open issues in an easily digestible format. For example, the graphical user interface may include graphical elements that effectively convey the severity level of different issues in a manner that allows the user to discriminate more sever issues from less, and at various level of severity granulation. Consequently, use of the dashboard may reduce a cognitive burden on a user.

For example, use of the graphical user interface may relieve the user of needing to view and interpret the monitored variables. As discussed above, due to the quantity of such monitored variables, personal analysis of the monitored variables may be intractable. Consequently, the disclosed process and devices herein may provide for an improved process of resource allocation and analysis that may not otherwise be possible to perform in the human mind. Further, by relieving the user of this cognitive burden, the user may be empowered to make better resource allocation decisions by focusing their cognitive effort on allocation rather than analysis tasks. Accordingly, the resulting allocation decisions may provide an improved system that is better able to resolve open issues in a timelier and/or effective manner when compared to conventional approaches.

The user may communicate allocation decisions through the obtained input. For example, the user may make personnel allocation decisions and/or other types of allocation decisions based on the information presented in the graphical user interface. Consequently, the resulting input and downstream decisions may be based on the graphical user interface and/or information content thereof.

As shown by operation 538, the apparatus 300 includes means, such as processor 302, memory 304, dashboard management circuitry 308, Graphical user interface management circuitry 310, input hardware 320, communications hardware 330, display hardware 340, and storage device 370 or the like, for performing an action set based on the input to manage the risk in the system. The action set may be performed by, for example, performing one or more actions specified or otherwise indicated by the obtained input. For example, the obtained input may be used to drive personnel allocation systems and/or other types of systems for managing application of effort to open issue resolution.

The method may end following operation 538.

FIGS. 5A-5D illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Example System Operations

Figure 6B:
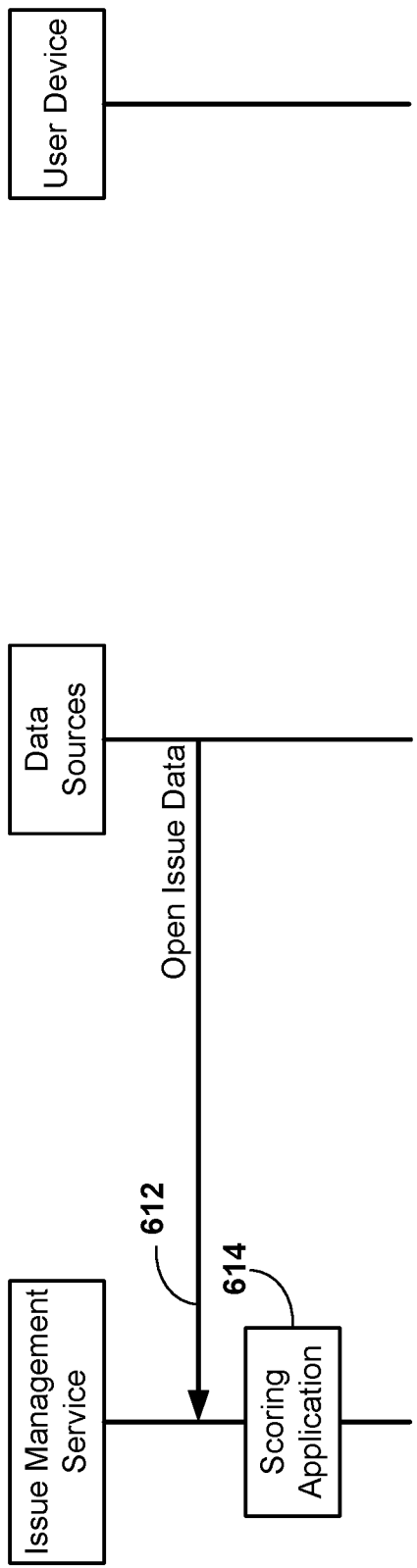
Figure 6C:
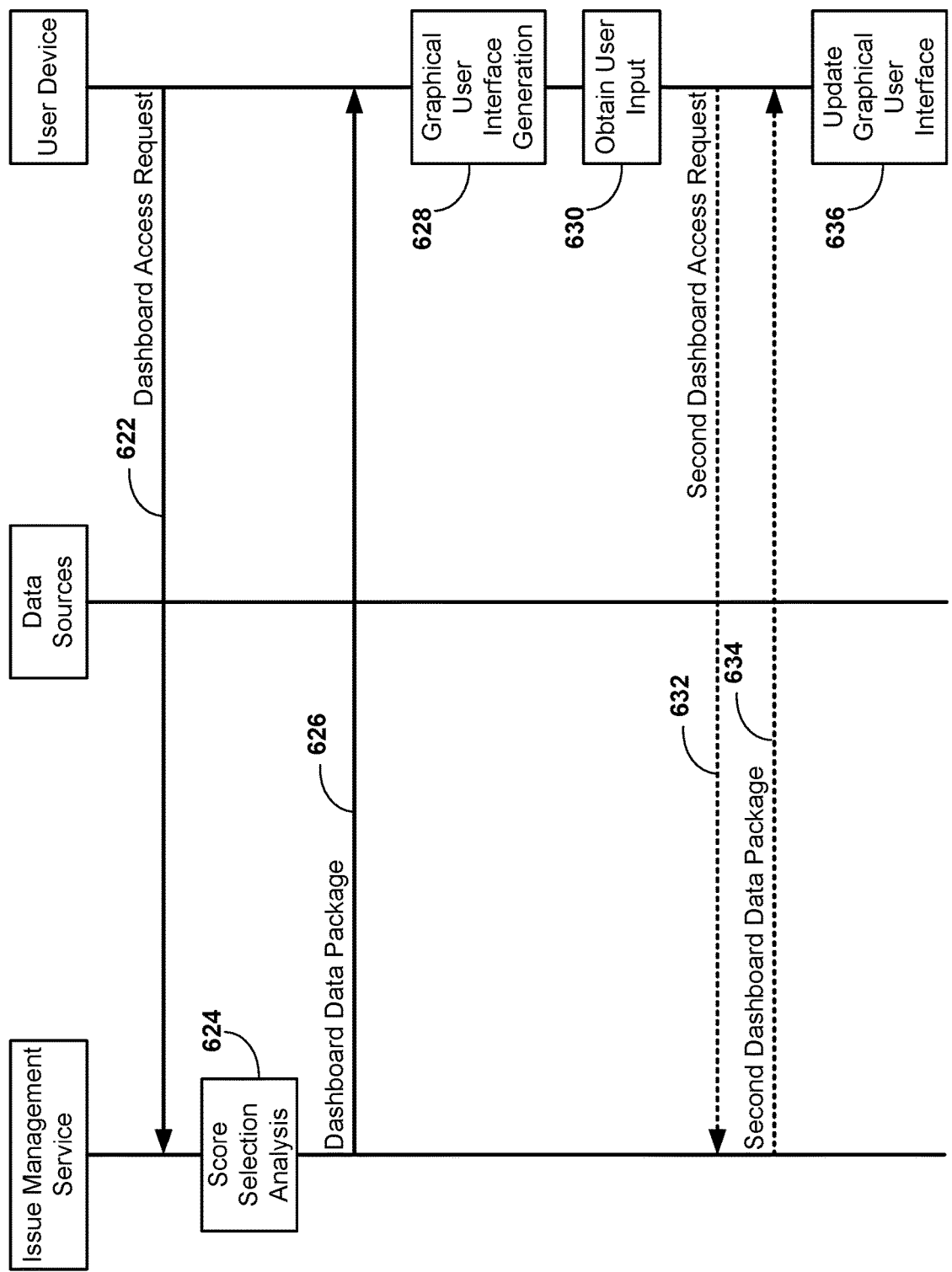

As noted above, user devices and issue management services may utilize dashboard to manage risk in a system. FIGS. 6A-6C show diagrams illustrating example operations performed by components of a distributed system that may be performed during their operation. In these figures, operations performed by an issue management service are shown along the line extending from the box labeled "Issue Management Service", operations performed by a data source are shown along the line extending from the box labeled "Data Source", and operations performed by a user device are shown along the line extending from the box labeled "User Device". Operations impacting multiple devices, such as data transmissions between the devices, are shown using arrows extending between these lines. Generally, the operations are ordered temporally with respect to one another. However, it will be appreciated that the operations may be performed in other orders from those illustrated herein.

Turning first to FIG. 6A, at operation 602, variable discrimination circuitry 206, score generation circuitry 208, dashboard management circuitry 210, processor 202, and/or other components of apparatus 200 obtain historical issue data from the data sources. The historical issue data may include the values of variables over time and the resulting outcome.

After being obtained, at operations 604, 606, and 608, the components of apparatus 200 may perform one or more analysis to obtain a scoring system usable to score open issues. First, variable analysis in 604 may be performed to identify a subset of the variables monitored that have higher predictive power (e.g., predictive of the corresponding outcomes of the historic open issues) than other variables. Once the subset is identified, predictive power analysis in 606 may be performed to identify a magnitude of the predictive power of each of the variables of the subset. The predictive power of each variable of the subset may be subjected to scoring analysis in 608 in which a scoring rule for each variable of the subset is generated. The rules may be based, for example, on the types of the variables, the ranges over which the variables run, the relative predictive power of each variable, and/or other factors. The resulting rules may be used as a scoring system to manage open issues.

Turning next to FIG. 6B, at operation 612, variable discrimination circuitry 206, score generation circuitry 208, dashboard management circuitry 210, processor 202, and/or other components of apparatus 200 obtain open issue data from the data sources. The open issue data may reflect live issues that may need to be managed, and may have corresponding negative outcomes should the issue not be managed within prescribed period of time. The historic issue data on which a scoring system is based may include similar issues such that the resulting scoring system may take into account likely future outcomes for the open issues in the open issue data.

After being obtained, at operation 614, the components of apparatus 200 may perform scoring application to the open issues data. The scoring application may include generating scores for each of the open issues using the scoring system. The resulting scores may be used to drive resource allocation processes.

Turning to FIG. 6C, at operation 622, dashboard management circuitry 308, processor 302, and/or other components of apparatus 300 generate and provide a dashboard access request to the issue management system. The dashboard access request may request scores for open issues scored as discussed with respect to FIG. 6B.

At operation 624, variable discrimination circuitry 206, score generation circuitry 208, dashboard management circuitry 210, processor 202, and/or other components of apparatus 200 perform score selection analysis to generate a dashboard data package. The score selection processes may discriminate scores for various open issues on the basis of the dashboard access request, which may only request a portion of the scored open issues.

At operation 626, variable discrimination circuitry 206, score generation circuitry 208, dashboard management circuitry 210, processor 202, and/or other components of apparatus 200 provide the dashboard data package to the user device.

At operation 628, dashboard management circuitry 308, processor 302, display hardware 340, and/or other components of apparatus 300 generate a graphical user interface. The graphical user interface may be similar to that shown in FIG. 4 and may be based on the scores for the open issues included in the dashboard data package. The graphical user interface may be displayed to a user of the user device.

At operation 630, dashboard management circuitry 308, processor 302, input hardware 320, and/or other components of apparatus 300 obtain input from a user. The input from the user may indicate that other information should be included in the dashboard, such as other open issues.

At operation 632, dashboard management circuitry 308, processor 302, and/or other components of apparatus 300 send a second dashboard access request to the issue management service. The second dashboard access request may request other scores for other open issues.

At operation 634, variable discrimination circuitry 206, score generation circuitry 208, dashboard management circuitry 210, processor 202, and/or other components of apparatus 200 provide a second dashboard data package to the user device which include the other scores.

At operation 636, dashboard management circuitry 308, processor 302, display hardware 340, and/or other components of apparatus 300 update the graphical user interface. The update may be based on the second dashboard data package thereby allowing the user to be informed of the severity of the other open issues, as specified in the second dashboard access request. Consequently, a user may be better able to make allocation decisions by view discretely viewing different representations of varying groups of open issues.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for managing risk in a system, the method comprising:

obtaining, by dashboard management circuitry of an issue management system, a dashboard access request for a portion of open issues managed by the issue management system, the issue management system storing a plurality of variables associated with each open issue of the open issues;

obtaining, by the dashboard management circuitry and responsive to the dashboard access request, a dashboard data package based on scores for the portion of open issues, the scores indicating a severity level of the open issues of the portion of open issues and being based on the plurality of variables that are stored in the issue management system, wherein obtaining the dashboard data package comprises:

generating, for each open issue of the portion of open issues, a severity score using a scoring system based on historical issues and corresponding issue outcomes, wherein for a respective open issue, the scoring system ascribes a zero weight to a portion of variables of the plurality of variables identified as being uncorrelated to a respective issue outcome for the open issue; and performing, by the dashboard management circuitry, an action set using the dashboard data package to manage the portion of open issues, wherein performing the action set comprises allocating computing resources to at least one open issue of the portion of open issues based on the dashboard data package.

2. The method of claim 1, wherein the scoring system ascribes zero weight to a majority of the plurality of variables and specifies weighting metrics from a minority of the plurality of variables usable to obtain a score for each of the minority of the plurality of variables.

3. The method of claim 2, wherein the scoring system ascribes non-zero weight to a minority of the plurality of variables, and wherein a non-zero weight ascribed to each variable of the minority of the plurality of variables is based on an absolute issue outcome predictive power level of its respective variable of the minority of the plurality of variables.

4. The method of claim 3, wherein the absolute issue outcome predictive power level of the respective variable is based, at least in part, on one of a population stability index analysis, a weight of evidence analysis, and an information value analysis of the minority of the plurality of variables.

5. The method of claim 1, wherein the scoring system ascribes quantities of points to variables of the plurality of variables and the scores are based on a summing of the quantities of points for variables of the plurality of variables corresponding to each of the open issues.

6. The method of claim 1, wherein the plurality of variables comprises at least one variable indicating:

a number of days an open issue of the open issues has been open;

a quantity of times a period for closing the open issue has been extended;

a classification of the open issue;

a quantity of corrective actions performed to correct the open issue;

a quantity of related corrective actions performed to correct any of the open issues other than the open issue;

a rating of the open issue;

a quantity of reporting while the open issue is open;

a root cause of the open issue;

a name of an entity that is enforcing the open issue;

a type of notification provided by the entity for the open issue; and a classification of a source of the open issue.

7. The method of claim 6, wherein the scoring system ascribes varying quantities of points for different ranges of the number of days the open issue has been open.

8. The method of claim 6, wherein the scoring system ascribes a quantity of points for the quantity of times the period of closing the open issue has been extended exceeding a threshold.

9. The method of claim 6, wherein the scoring system ascribes a quantity of points for the classification of the open issue being a predetermined classification, the predetermined classification indicating that regulatory action will be taken should the open issue not be closed within a prescribed period of time.

10. An apparatus for managing risk in a system, the apparatus comprising:

communication hardware configured to obtain a dashboard access request for a portion of open issues managed by an issue management system, the apparatus storing a plurality of variables associated with each open issue of the open issues; and dashboard management circuitry configured to:

obtain, responsive to the dashboard access request, a dashboard data package based on scores for the portion of open issues, the scores indicating a severity level of the open issues of the portion of open issues and being based on the plurality of variables that are stored in the issue management system, wherein obtaining the dashboard data package comprises:

generating, for each open issue of the portion of open issues, a severity score using a scoring system based on historical issues and corresponding issue outcomes, wherein for a respective open issue, the scoring system ascribes a zero weight to a portion of variables of the plurality of variables identified as being uncorrelated to a respective issue outcome for the open issue, and perform an action set using the dashboard data package to manage the portion of open issues, wherein performing the action set comprises allocating computing resources to at least one open issue of the portion of open issues based on the dashboard data package.

11. The apparatus of claim 10, wherein the scoring system ascribes zero weight to a majority of the plurality of variables and specifies weighting metrics from a minority of the plurality of variables usable to obtain a score for each of the minority of the plurality of variables.

12. The apparatus of claim 11, wherein the scoring system ascribes non-zero weight to a minority of the plurality of variables, and wherein a non-zero weight ascribed to each variable of the minority of the plurality of variables is based on an absolute issue outcome predictive power level of its respective variable of the minority of the plurality of variables.

13. The apparatus of claim 12, wherein the absolute issue outcome predictive power level of the respective variable is based, at least in part, on one of a population stability index analysis, a weight of evidence analysis, and an information value analysis of the minority of the plurality of variables.

14. The apparatus of claim 10, wherein the scoring system ascribes quantities of points to variables of the plurality of variables and the scores are based on a summing of the quantities of points for variables of the plurality of variables corresponding to each of the open issues.

15. The apparatus of claim 10, wherein the plurality of variables comprises at least one variable indicating:
- a number of days an open issue of the open issues has been open;
- a quantity of times a period for closing the open issue has been extended;
- a classification of the open issue;
- a quantity of corrective actions performed to correct the open issue;
- a quantity of related corrective actions performed to correct any of the open issues other than the open issue;
- a rating of the open issue;
- a quantity of reporting while the open issue is open;
- a root cause of the open issue;
- a name of an entity that is enforcing the open issue;
- a type of notification provided by the entity for the open issue; and
- a classification of a source of the open issue.

16. The apparatus of claim 15, wherein the scoring system ascribes varying quantities of points for different ranges of the number of days the open issue has been open.

17. The apparatus of claim 15, wherein the scoring system ascribes a quantity of points for the quantity of times the period of closing the open issue has been extended exceeding a threshold.

18. The apparatus of claim 15, wherein the scoring system ascribes a quantity of points for the classification of the open issue being a predetermined classification, the predetermined classification indicating that regulatory action will be taken should the open issue not be closed within a prescribed period of time.

* * * * *